United States Patent

[11] 3,573,347

[72] Inventor Otto Jensen
 Plymouth, Bahamas
[21] Appl. No. 856,769
[22] Filed Sept. 10, 1969
[45] Patented Apr. 6, 1971
[73] Assignee ITE Imperial Corporation
 Philadelphia, Pa.

[54] INTERNAL PRESSURE JOINT FOR HIGH VOLTAGE TUBULAR BUS
 8 Claims, 5 Drawing Figs.
[52] U.S. Cl............................................... 174/94, 174/88
[51] Int. Cl...................................................... H02g 15/08

[50] Field of Search........................................... 174/88.3, 88 (B), 94, 74, 75, 99 (B); 339/22B

[56] References Cited
 UNITED STATES PATENTS
 3,371,151 2/1968 Bonzo et al................... 174/88BX
 3,389,213 6/1968 Niemoller..................... 174/88B

*Primary Examiner*—Darrell L. Clay
*Attorney*—Ostrolenk, Faber, Gerb & Soffen

ABSTRACT: Spaced pressure blocks are inserted into the end of a hollow cylindrical bus. A jackscrew, operated through an opening in the wall of the bus, presses the blocks away from one another and into the walls of the bus. The pressure blocks are connected to a prewelded disk which has flexible conductors extending therefrom.

PATENTED APR 6 1971  3,573,347

INVENTOR.
OTTO JENSEN

BY

Ostrolenk, Faber, Gerb & Soffen
ATTORNEYS

INVENTOR.
OTTO JENSEN

INTERNAL PRESSURE JOINT FOR HIGH VOLTAGE TUBULAR BUS

This invention relates to electrical connectors, and more specifically relates to a pressure connector for connecting tubular conductors to one another.

When long lengths of hollow tubular bus are to be connected together, welding in the field in usually necessary. Where the bus is at high voltage, for example 345 kv., great care is necessary for such field welds to eliminate sharp corners which could create excessively high dielectric stresses.

The present invention provides a novel pressure joint which can be used to connect tubular bus without requiring welding in the field. Thus, a pair of pressure blocks are inserted into the end of the bus and a jackscrew is operated to press the blocks away from one another and into high-pressure contact with the interior of the bus. The blocks are factory welded to flexible or fixed conductors which are factory welded, at their other end, to the bus to which connection is to be made. Therefore, it is only necessary to connect the pressure blocks to the interior of one bus in the field, and no field weld is necessary.

Alternatively, two sets of such pressure blocks can be provided at opposite ends of flexible or tubular conductors, with both buses receiving respective pressure blocks.

The novel connection is useful for high voltage application since the entire assembly is contained within the end of the bus. Therefore, high dielectric stress is not created on the exterior of the bus termination.

Accordingly, a primary object of this invention is to provide a novel connector for connecting hollow tubular bus in the field without requiring field welds.

A further object of this invention is to provide a novel pressure connector for high voltage hollow tubular conductors.

These and other objects of this invention will become apparent from the following description when taken in connection with the drawings in which.

Figure 1:
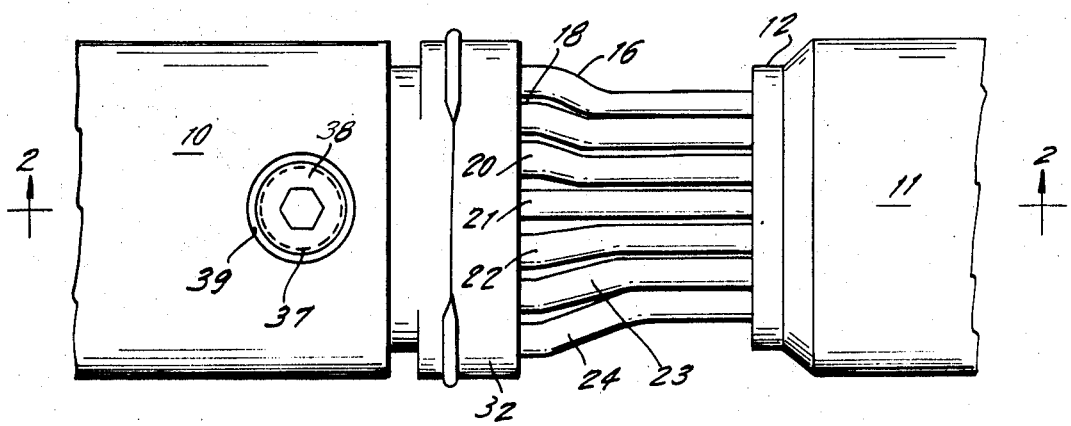
FIG. 1 is an elevational view of two buses connected in accordance with the invention.
Figure 2:
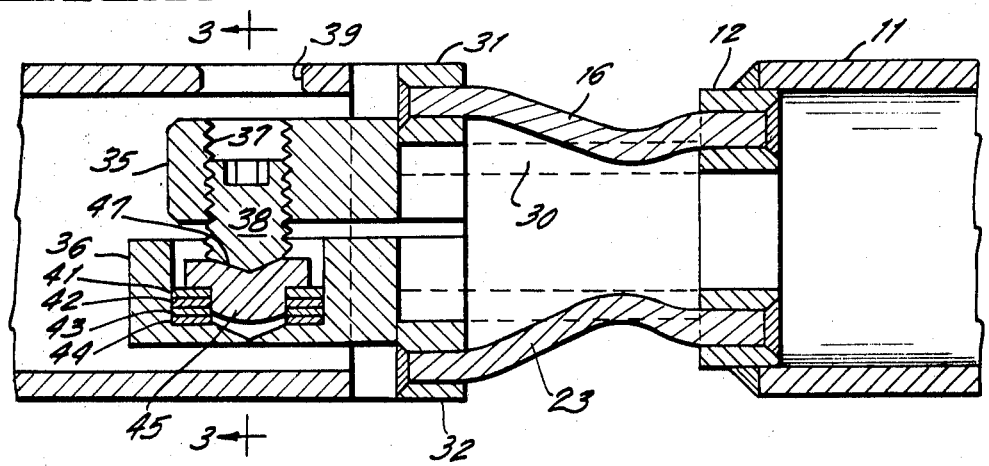
FIG. 2 is a cross-sectional view of FIG. 1 taken across section line 2—2 in FIG. 1.
Figure 3:
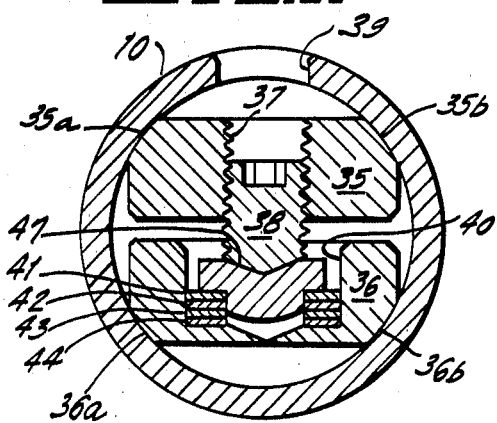
FIG. 3 is a cross-sectional view of FIG. 2 taken across section line 3—3 in FIG. 2.
Figure 4:
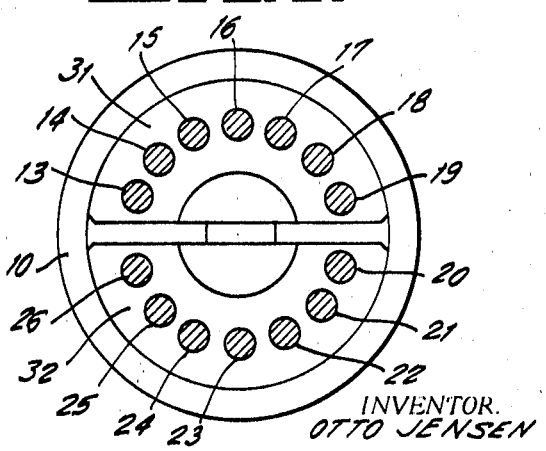
FIG. 4 is a cross-sectional view of FIG. 2 taken across section line 4—4 in FIG. 2.

Referring now to the FIGS., FIGS. 1 and 4 show the ends of two buses 10 and 11 which are to be field connected. In the embodiment shown, bus 11 has a ring 12 factory welded thereto which has a plurality of stranded flexible cables 13 to 26 factory welded thereto, as shown in FIG. 4. Selected cables are shown in FIGS. 1 and 2. Alternatively, a hollow conductive cylinder 30, shown in FIG. 2, could be used in place of cables 13 to 26.

Figure 5:
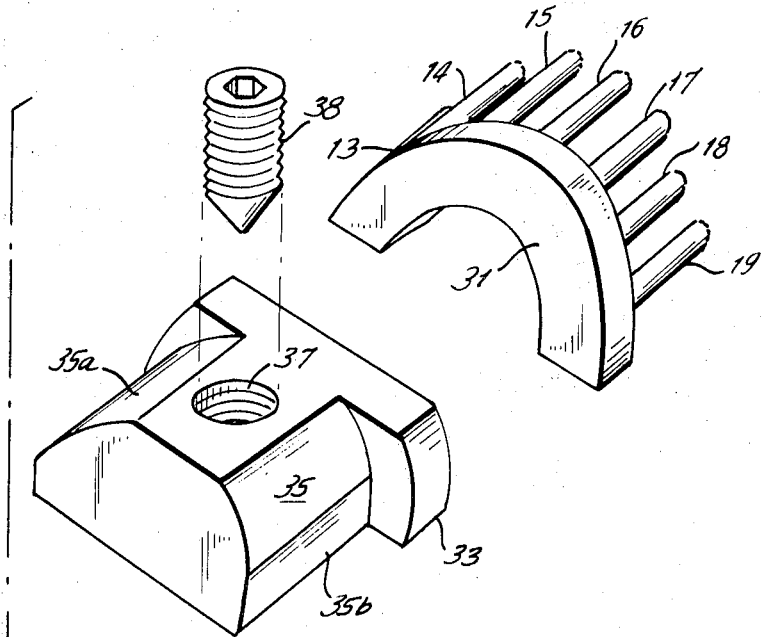
FIG. 5 is an exploded perspective view of the pressure block assembly of FIGS. 1 to 4.
Figure 5:
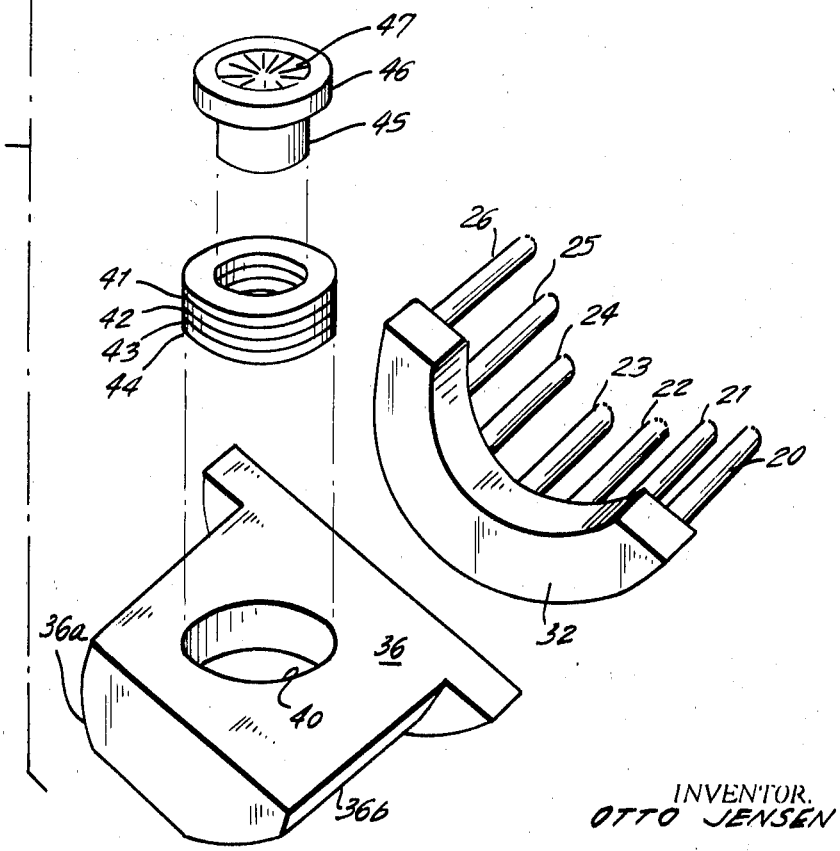

The other ends of cables 13 to 26 (or the tube 30 of FIG. 2) are factory welded to split rings 31 and 32. Split rings 31 and 32 are, in turn, welded to the flanges 33 and 34, respectively, (FIG. 5) of pressure blocks 35 and 36, respectively. Upper pressure block 35 has a threaded opening 37 therethrough which receives a jackscrew 38 through opening 39 in bus 10. Lower block 36 has a well 40 therein which has a plurality of dished pressure springs 41 to 44 at the bottom thereof. A flanged pressure member 45 extends through central openings in springs 41 to 44 and the flange 46 thereof captures the top of spring 41. Member 45 has a depression 47 in the top thereof which receives the conical bottom of jackscrew 38.

In operation, bus 10 and 11 arrive in the field with members 11, 12, 16 to 26 (or 30), 31, 35 and 36 having been prewelded in the factory. To make connection between buses 10 and 11, blocks 35 and 36 are placed inside the end of bus 10, after the springs 41 to 44 and member 45 have been loaded into well 40. Jackscrew 38 is then inserted through opening 39 and is threaded into thread 37 until the bottom of screw 38 reaches member 45. Thereafter, screw 38 is tightened, thereby forcing members 35 and 36 away from one another through springs 41 to 44 until a desired pressure connection is formed between arcuate surfaces 35a–35b and 36a–36b of blocks 35 and 36, respectively, and the interior of bus 10.

It will be noted that no field welding is necessary with the present invention. Moreover, the hardware involved is contained inside the end of bus 10, thereby to eliminate the danger of excessive dielectric stresses when used with high voltage bus.

While FIGS. 1 to 5 show the invention for a case where field connection is made only to one bus (bus 10), it will be apparent that the clamp may be "double ended." That is, cables 13 to 26 may be connected to identical pressure blocks at its both ends, rather than only one end, with all welds between cables and pressure blocks having been made in the field. It is then only necessary to form openings, such as opening 39 for bus 10, in both buses 10 and 11, and to form a pressure connection to the interior of the ends of both buses 10 and 11.

Although this invention has been described with respect to particular embodiments, it should be understood that many variations and modifications will now be obvious to those skilled in the art, and, therefore, the scope of the invention is limited not by the specific disclosure herein, but only by the appended claims.

The embodiments of the invention in which an exclusive privilege or property is claimed are defined as follows:

I claim:

1. An internal pressure connector for the end of a hollow tubular bus; said pressure connector comprising, in combination; first and second spaced blocks of conductive material; each of said first and second blocks having a connection region for making pressure connection to the internal surface of said bus; at least a portion of each of said first and second blocks disposed within the end of said hollow bus; at least one of said first and second blocks having a conductor means extending therefrom out of the end of said bus; one of said first and second spaced blocks having a threaded opening therethrough; an opening in said bus in alignment with said threaded opening; a pressure screw threaded into said threaded opening; the end of said threaded opening engaging a surface of the other of said first and second blocks, thereby to press said first and second blocks away from one another and to press their said connection regions into engagement with interior regions of said bus.

2. The pressure connector of claim 1 wherein at least a major portion of said first and second blocks are disposed in the interior of said bus.

3. The pressure connector of claim 1 wherein said other of said first and second pressure blocks has a depression therein in communication with said threaded opening; a plurality of spring washers in the bottom of said depression and pressure means interposed between said jackscrew and said other of said first and second pressure blocks.

4. The pressure connector of claim 1 wherein said first and second pressure blocks comprise generally semicylindrical members having truncated sides.

5. The pressure connector of claim 1 wherein said conductor means comprises a plurality of flexible conductors.

6. The pressure connector of claim 1 wherein said conductor means comprises a rigid conductive cylinder.

7. The pressure connector of claim 1 wherein the free outer end of said conductor means is permanently connected to the end of a second bus.

8. The pressure connector of claim 1 wherein the free outer end of said conductor means is permanently connected to a second internal pressure connector identical to said internal pressure connector.